United States Patent [19]

Hosoi et al.

[11] Patent Number: 4,873,438

[45] Date of Patent: Oct. 10, 1989

[54] RADIATION IMAGE READ-OUT APPARATUS USING A FLUORESCENT LIGHT GUIDE

[75] Inventors: Yuichi Hosoi; Kenji Takahaski, both of Kanagawa, Japan

[73] Assignee: Fuji Photo Film Co., Ltd., Kanagawa, Japan

[21] Appl. No.: 144,982

[22] Filed: Jan. 19, 1988

[30] Foreign Application Priority Data

Jan. 16, 1987 [JP] Japan .................................. 62-8570

[51] Int. Cl.$^4$ ..................... G03B 42/08; G01N 23/04; G01T 1/105
[52] U.S. Cl. ............................. 250/327.2; 250/484.1
[58] Field of Search .......... 250/484.1, 327.2, 327.2 D, 250/327.2 E, 327.2 F, 327.2 L

[56] References Cited

U.S. PATENT DOCUMENTS

| | | | |
|---|---|---|---|
| 4,258,264 | 3/1981 | Kotera et al. | 250/327.2 |
| 4,276,473 | 6/1981 | Kato et al. | 250/327.2 |
| 4,315,318 | 2/1982 | Kato et al. | 250/337 |
| 4,346,295 | 8/1982 | Tanaka et al. | 250/337 |
| 4,371,897 | 2/1983 | Kramer | 250/227 |
| 4,387,428 | 6/1983 | Ishida et al. | 250/337 |
| 4,629,890 | 12/1986 | Goto et al. | 250/327.2 |

FOREIGN PATENT DOCUMENTS 0011395  2/1981  Japan .................................. 250/327.2

Primary Examiner—Janice A. Howell
Assistant Examiner—William F. Rauchholz
Attorney, Agent, or Firm—Sughrue, Mion, Zinn, Macpeak & Seas

[57] ABSTRACT

A radiation image read-out apparatus comprises a stimulating ray source for producing stimulating rays which excite a stimulable phosphor, a device for scanning the stimulating rays on a stimulable phosphor sheet carrying a radiation image stored thereon in a main scanning direction, and a fluorescent light guide member obtained by forming a sheet-shaped material containing a phosphor and disposed so that a surface of the fluorescent light guide member receives the light emitted by the stimulable phosphor sheet when the stimulable phosphor sheet is scanned by the stimulating rays. A photodetector is closely contacted with an end face of the fluorescent light guide member, and a sub-scanning device is provided for moving the stimulable phosphor sheet with respect to the stimulating rays in a sub-scanning direction approximately normal to the main scanning direction.

5 Claims, 2 Drawing Sheets

RADIATION IMAGE READ-OUT APPARATUS USING A FLUORESCENT LIGHT GUIDE

BACKGROUND OF THE INVENTION

1. Field of the Invention

This invention relates to a radiation image read-out apparatus for exposing a stimulable phosphor sheet carrying a radiation image stored thereon to stimulating rays which cause it to emit light in proportion to the stored radiation energy, and detecting the emitted light to obtain electric image signals. This invention particularly relates to a radiation image read-out apparatus which efficiently guides and detects the light emitted by the stimulable phosphor sheet and which is formed small.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then exposed to stimulating rays such as a laser beam which cause it to emit light in proportion to the stored radiation energy. The light emitted by the stimulable phosphor sheet upon stimulation thereof is photoelectrically detected and converted to electric image signals, which are processed as desired to reproduce a visible image having an improved image quality, particularly a high diagnostic efficiency and accuracy.

In the aforesaid radiation image recording and reproducing system, detection of the light emitted by the stimulable phosphor sheet has heretofore been carried out in two manners as described below.

Specifically, picture element division is effected by scanning with stimulating rays, and the light emitted by the stimulable phosphor sheet is detected by a light receiving device having a wide light receiving face, such as a photomultiplier or a photoconductive device. Alternatively, picture element division is effected by a light receiving device such as a two-dimensional solid state image pickup device or a semiconductor line sensor, and electric image signals are sequentially generated by an electric circuit.

However, with the former method, it s necessary to use a light guide member having a complicated shape for efficiently guiding the light emitted by the stimulable phosphor sheet to the photodetector, and therefore the read-out apparatus becomes large. Specifically, as disclosed in, for example, U.S. Pat. No. 4,346,295, the aforesaid light guide member is obtained by forming one end of a light guiding sheet in a linear shape to face a main scanning line of stimulating rays on the stimulable phosphor sheet, and bending the other end of the light guiding sheet to match the light receiving face of the photodetector. The light guide member having such a complicated shape requires a large installation space.

On the other hand, in the case where picture element division is effected by a light receiving device, the light receiving face of each of the elements constituting the light receiving device becomes small, the efficiency of guiding of the light emitted by the stimulable phosphor sheet becomes low, and therefore the S/N ratio in the read-out image signals is deteriorated. To solve this problem, a condensing lens may be utilized for guiding the light emitted by the stimulable phosphor sheet. In this case, however, the light receiving solid angle of the lens cannot actually be made so large, and therefore the light guiding efficiency cannot be improved so much.

Also, as the light receiving area of the photodetector becomes large, the dark current increases, and the S/N ratio deteriorates with respect to a predetermined optical amount. This tendency becomes more pronounced in the case of a solid state semiconductor device. Therefore, it is desired to improve the light guiding efficiency without increasing the light receiving area.

SUMMARY OF THE INVENTION

The primary object of the present invention is to provide a radiation image read-out apparatus which is small and wherein light emitted by a stimulable phosphor sheet in proportion to the stored radiation energy upon stimulation thereof is efficiently guided t a photodetector having a relatively small area so that read-out image signals are obtained at a high S/N ratio.

Another object of the present invention is to provide a radiation image read-out apparatus which enables reproduction of a visible radiation image having an improved image quality, particularly a high diagnostic efficiency and accuracy.

The present invention provides a radiation image read-out apparatus comprising:
 (i) a stimulating ray source for producing stimulating rays which excite a stimulable phosphor,
 (ii) a stimulating-ray main scanning means for scanning said stimulating rays on a stimulable phosphor sheet carrying a radiation image stored thereon,
 (iii) a fluorescent light guide member obtained by forming a sheet-shaped material containing a phosphor and disposed in such a direction that a surface of said fluorescent light guide member receives the light emitted by said stimulable phosphor sheet when said stimulable phosphor sheet is scanned by said stimulating rays,
 (iv) a photodetector closely contacted with an end face of said fluorescent light guide member, and
 (v) a sub-scanning means for moving said stimulable phosphor sheet with respect to said stimulating rays in a direction approximately normal to the direction of said scanning.

When the light emitted by the stimulable phosphor sheet impinges upon the surface of the fluorescent light guide member, the phosphor contained in the fluorescent light guide member is stimulated by the light to radiate fluorescence. The fluorescence advances to the end faces of the fluorescent light guide member by repeating total reflection inside of the fluorescent light guide member. Therefore, the fluorescence having a high intensity is radiated from the end faces of the fluorescent light guide member in such a form that energy of the light emitted by the stimulable phosphor sheet is condensed. The optical amount of the fluorescence thus radiated is proportional to the optical amount of the light emitted by the stimulable phosphor sheet, and therefore the optical amount of the light emitted by the stimulable phosphor sheet can be detected indirectly by detecting the optical amount of the fluorescence by use of the photodetector closely contacted with either end face of the fluorescent light guide member.

With the radiation image read-out apparatus in accordance with the present invention, the light emitted by the stimulable phosphor sheet in proportion to the stored radiation energy can be efficiently detected to obtain read-out image signals at a high S/N ratio. Therefore, a visible radiation image having an improved image quality, particularly a high diagnostic efficiency and accuracy, can be reproduced. Also, with the radiation image read-out apparatus wherein the light emitted by the stimulable phosphor sheet is guided by use of the fluorescent light guide member having a very simple shape, the apparatus can be made markedly smaller and cheaper than the conventional apparatus wherein the light guide member having a complicated shape as mentioned above is used.

DESCRIPTION OF THE PREFERRED EMBODIMENTS

The present invention will hereinbelow be described in further detail with reference to the accompanying drawings.

Figure 1:
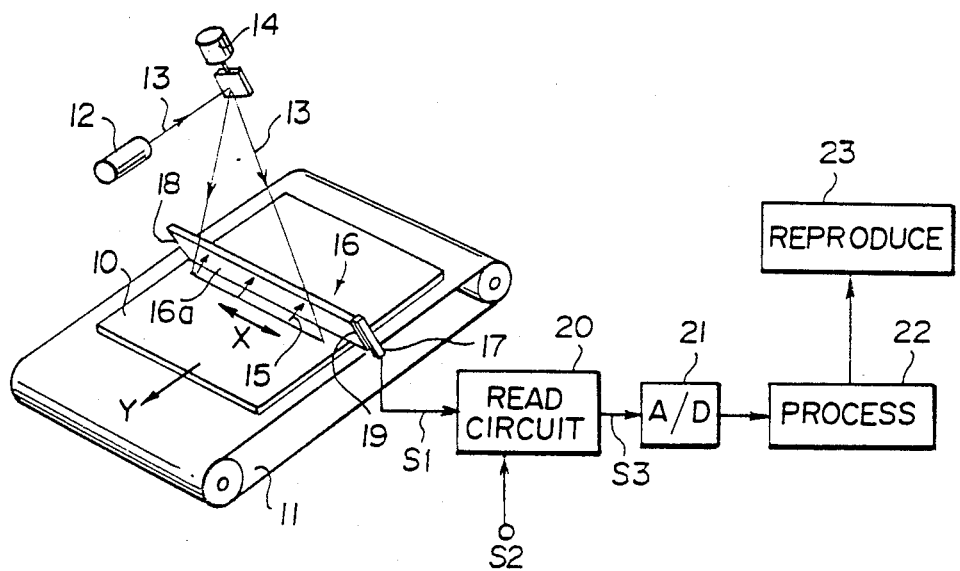
FIGS. 1 and 2 are a schematic perspective view and a side view showing an embodiment of the radiation image read-out apparatus in accordance with the present invention.
Figure 2:
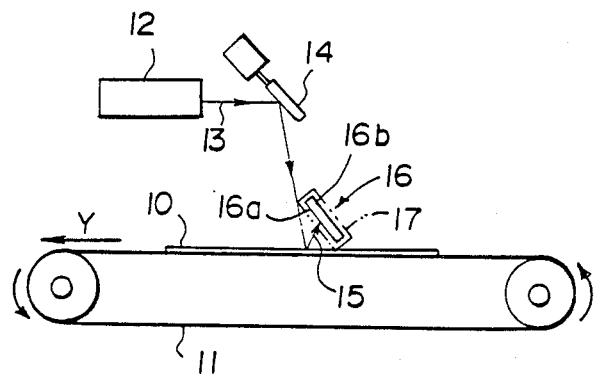

With reference to FIGS. 1 and 2, a stimulable phosphor sheet 10 carrying a radiation image of an object stored thereon, by way of example, by being exposed to a radiation passing through the object, is moved by a sheet movement means 11 constituted by an endless belt or the like in a sub-scanning direction as indicated by the arrow Y. At the same time, a laser beam 13 produced as stimulating rays by a laser beam source 12 is deflected by a light deflector 14, which may be a galvanometer mirror or the like, and is made to scan on the stimulable phosphor sheet 10 in a main scanning direction as indicated by the arrow X approximately normal to the sub-scanning direction as indicated by the arrow Y. As the stimulable phosphor sheet 10 is thus exposed to the laser beam 13, the exposed portion of the stimulable phosphor sheet 10 emits light 15 in an optical amount proportional to the stored radiation energy.

A fluorescent light guide member 16 is disposed above the stimulable phosphor sheet 10. The fluorescent light guide member 16 is composed of a plastic material and a phosphor dispersed therein. In this embodiment, the fluorescent light guide member 16 is selected so that it radiates fluorescence mainly having a wavelength of 500nm upon receiving the light 15 mainly having a wavelength of approximately 400nm emitted by the stimulable phosphor sheet 10. As such a fluorescent light guide member, a product is supplied by Bayer Japan under the trade name Lisa-Plastic. In this embodiment, the fluorescent light guide member 16 is formed in an elongated rectangular shape, and is disposed with its lower surface 16a facing the main scanning line of the laser beam 13 on the stimulable phosphor sheet 10. A photodetector 17 constituted by, by way of example, a CCD type solid state semiconductor device is closely contacted with a side end face 16b of the fluorescent light guide member 16. The light 15 emitted by the stimulable phosphor sheet 10 in the manner as mentioned above enters the fluorescent light guide member 16 from its lower surface 16a.

Upon being exposed to the light 15 emitted by the stimulable phosphor sheet 10, the fluorescent light guide member 16 radiates the fluorescence therein. The fluorescence advances to the end face of the fluorescent light guide member 16 by repeating total reflection therein, and is radiated in the condensed form from the side end face 16b having an area markedly smaller than the area of the surface 16a. In this embodiment, a reflection member 18 is formed by, by way of example, vacuum evaporation of a metal material on the side end face of the fluorescent light guide member 16 opposite to the side end face 16b closely contacted with the photodetector 17. Therefore, the fluorescence is radiated mainly from the side end face 16b. As the reflection member 18, instead of the metal film formed by vacuum evaporation, a metal face, a white paint layer or the like may be utilized. Though not shown, a reflection member may be provided close to the upper surface of the fluorescent light guide member 16, i.e. the surface opposite to the surface 16a.

The fluorescence radiated from the side end face 16b of the fluorescent light guide member 16 in the manner as mentioned above is detected by the photodetector 17. The optical amount of the fluorescence is proportional to the optical amount of the light 15 emitted by the stimulable phosphor sheet 10 as mentioned above, and therefore the output S1 of the photodetector 17 represents the optical amount of the light 15. The output S1 of the photodetector 17 is fed to a read-out circuit 20 for carrying out processing such as amplification or logarithmic conversion. Also, the output S1 is integrated in the unit of a predetermined period on the basis of a synchronizing signal S2 in synchronization with the scanning of the laser beam 13, so that analog read-out image signals S3 divided into picture elements are sequentially obtained by the read-out circuit 20. By way of example, the read-out image signals S3 are digitized by an A/D converter 21, and fed to an image processing circuit 22 for carrying out signal processing (image processing) such as gradation processing or frequency response processing. Then, the read-out image signals S3 are fed to an image reproducing apparatus 23 constituted by a CRT, a printer or the like, and used for reproducing the radiation image, which was stored on the stimulable phosphor sheet 10, as a visible image.

With the aforesaid embodiment wherein the light 15 emitted by the stimulable phosphor sheet 10 in proportion to the stored radiation energy is efficiently condensed to a small area by the fluorescent light guide member 16 having a markedly simple shape and is detected in this manner, the S/N ratio of the read-out image signals S3 becomes high, and the apparatus can be formed small. In general, the spectral sensitivity characteristics of the photodetector 17 constituted by the solid state semiconductor device deteriorate on the short wavelength side. However, with the fluorescent light guide member 16, the light 15 mainly having a wavelength of approximately 400nm emitted by the stimulable phosphor sheet 10 is wavelength-converted to the fluorescence mainly having a wavelength of 500nm as mentioned above, and therefore the light 15 emitted by the stimulable phosphor sheet 10 can be detected at a high sensitivity by the photodetector 17 having the aforesaid spectral sensitivity characteristics.

The fluorescent light guide member 16 and the laser beam 13 are selected so that the wavelength of the laser beam 13 does not overlap the stimulation wavelength range of the phosphor contained in the fluorescent light guide member 16, and the phosphor is not excited by the laser beam 13 reflected by the stimulable phosphor sheet 10. Also, the laser beam 13 reflected by the stimulable phosphor sheet 10 may enter the fluorescent light guide member 16, and therefore the phosphor contained in the fluorescent light guide member 16 is selected so that it radiates the fluorescence having a wavelength distribution different and far apart from the wavelength distribution of the laser beam 13. A filter 19 for transmitting the fluorescence radiated by the fluorescent light guide member 16 and intercepting the laser beam 13 as the stimulating rays should preferably be provided between the side end face 16b of the fluorescent light guide member 16 and the photodetector 17.

As the photodetector 17, a photoconductor type photodetector, a PIN photodiode, a photomultiplier or the like may also be employed. In the case where the picture element division type sensor such as a SIT-, CCD- or MOS- type solid state semiconductor device is employed, signal processing such as integration is carried out.

Figure 3:
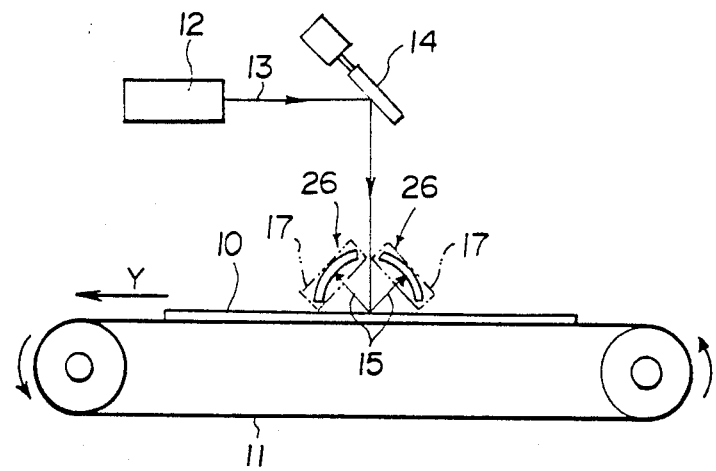
FIGS. 3 and 4 are side views showing further embodiments of the radiation image read-out apparatus in accordance with the present invention.

Another embodiment of the radiation image read-out apparatus in accordance with the present invention will hereinbelow be described with reference to FIG. 3. In FIG. 3, similar elements are numbered with the same reference numerals with respect to FIGS. 1 and 2. In this embodiment, fluorescent light guide members 26, 26 face the main scanning line of the laser beam 13 on the stimulable phosphor sheet 10 from either side of the main scanning line. The fluorescent light guide members 26, 26 are slightly spaced from each other, and the laser beam 13 is irradiated through the gap between the fluorescent light guide members 26, 26 to the stimulable phosphor sheet 10. As in the embodiment shown in FIG. 1, photodetectors 17, 17 are closely contacted with the side end faces of the fluorescent light guide members 26, 26 for detecting the fluorescence radiated by the fluorescent light guide members 26, 26 upon exposure to the light 15 emitted by the stimulable phosphor sheet 10. With the configuration wherein the fluorescent light guide members 26, 26 are disposed in this manner, the light 15 emitted by the stimulable phosphor sheet 10 can be detected efficiently. Also, in this embodiment, the fluorescent light guide members 26, 26 are formed in a curved shape so that the light 15 emitted by the stimulable phosphor sheet 10 can be guided more efficiently into the fluorescent light guide members 26, 26.

The output of the photodetectors 17, 17 may be added together and fed to the read-out circuit. Instead of providing the two photodetectors 17, 17, a single photodetector having a wide light receiving face capable of facing the side end faces of the fluorescent light guide members 26, 26 may be utilized.

Figure 4:
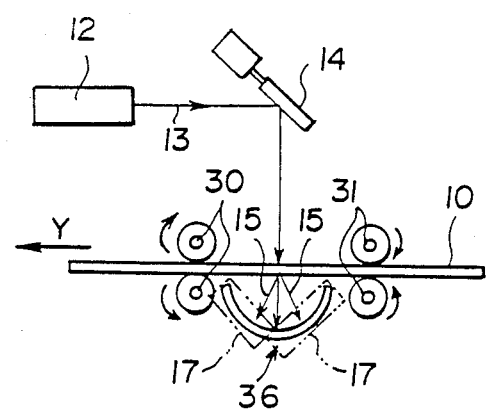

A further embodiment of the radiation image read-out apparatus in accordance with the present invention will hereinbelow be described with reference to FIG. 4. In FIG. 4, similar elements are numbered with the same reference numerals with respect to FIGS. 1 and 2. In this embodiment, the stimulable phosphor sheet 10 is composed of a transparent supporting material and a stimulable phosphor overlaid on the transparent supporting material. The stimulable phosphor sheet 10 is moved for sub-scanning with stimulating rays by two sets of sheet moving rollers 30 and 31 for nipping the stimulable phosphor sheet 10 on either side of the position of stimulating ray irradiation. Also, a curved fluorescent light guide member 36 faces the main scanning line on the stimulable phosphor sheet 10 from the side opposite to the irradiation side of the laser beam 13.

In the embodiment shown in FIG. 4, the stimulable phosphor sheet 10 exposed to the laser beam 13 emits the light 15 toward the fluorescent light guide member 36, the light 15 is guided by the fluorescent light guide member 36 and is detected by the photodetectors 17, 17. In this embodiment, the photodetectors 17, 17 constituted by solid state semiconductor devices are closely contacted with the side end faces of the fluorescent light guide member 36. However, instead of the photodetectors 17, 17, a single photomultiplier or a single solid state semiconductor device having a comparatively large light receiving face may be used instead of the photodetectors 17, 17.

The phosphor contained in the fluorescent light guide member may be, for example, an organic phosphor such as a coumarin derivative, a thioxanthene derivative, a perylene derivative, or a phorone complex as disclosed in Japanese Unexamined Patent Publication No. 56(1981)–36549, 56(1981)104987, 58(1983)-111886 or 59(1984)-89302.

We claim:
1. A radiation image read-out apparatus comprising:
   (i) a stimulating ray source for producing stimulating rays which excite a stimulable phosphor,
   (ii) a stimulating-ray main scanning means for scanning said stimulating rays on a stimulable phosphor sheet carrying a radiation image stored thereon,
   (iii) a fluorescent light guide member comprising a sheet-shaped material containing a phosphor disposed in such a direction that a main surface of said sheet-shaped material receives the light emitted by said stimulable phosphor sheet when said stimulable phosphor sheet is scanned by said stimulating rays, wherein said sheet-shaped material has a length, a width, and a thickness, said thickness being small in relation to said width, and said width being small in relation to said length, said main surface being defined by said length and width,
   (iv) a photodetector disposed for receiving fluorescence from an end face defined by said width and thickness of said sheet-shaped material of said fluorescent light sheet-shaped material upon exposure to the light emitted by said stimulable phosphor sheet, and
   (v) a sub-scanning means for moving said stimulable phosphor sheet with respect to said stimulating rays in a direction approximately normal to the direction of said scanning,
      wherein a filter for transmitting the fluorescence, and for intercepting said stimulating rays, is provided between said end face of said sheet-shaped material and said photodetector.
2. An apparatus as defined in claim 1 wherein said fluorescent light guide member is composed of a plastic material and an organic phosphor dispersed therein.

3. An apparatus as defined in claim 1 wherein said photodetector comprises a solid state semiconductor device.

4. An apparatus as defined in claim 1, wherein said fluorescence radiated by said fluorescent light guide member has a first wavelength, and said stimulating rays have a second wavelength, said first and second wavelengths being different from one another 5. A radiation image read-out apparatus comprising:
(i) a stimulating ray source for producing stimulating rays which excite stimulable phosphor,
(ii) a stimulating-ray main scanning means for scanning said stimulating rays on a stimulable phosphor sheet carrying a radiation image stores thereon,
(iii) a flourescent light guide member comprising a sheet-shaped material having a length, a width and a thickness which is small relative to said width, and said width being small relative to said length, a main surface of said material being defined by said length and width, and an end surface of said material being defined by said width and thickness, said material containing a phosphor and being disposed in such a direction that said main surface receives the light emitted by said stimulable phosphor sheet when said stimulable phosphor sheet is scanned by said stimulating rays,
(iv) a photodetector closely contacted with said end surface, and
(v) a sub-scanning means for moving said stimulable phosphor sheet with respect to said stimulating rays in a direction approximately normal to the direction of said scanning.

* * * * *